United States Patent
Kondo

(10) Patent No.: US 7,440,769 B2
(45) Date of Patent: Oct. 21, 2008

(54) TARGET VALUE CONTROL METHOD FOR TRANSMISSION POWER CONTROL, BASE STATION CONTROL DEVICE AND MOBILE STATION USED FOR THE SAME

(75) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 514 days.

(21) Appl. No.: 10/543,814

(22) PCT Filed: Jan. 16, 2004

(86) PCT No.: PCT/JP2004/000310

§ 371 (c)(1),
(2), (4) Date: Aug. 1, 2005

(87) PCT Pub. No.: WO2004/068743

PCT Pub. Date: Aug. 12, 2004

(65) Prior Publication Data

US 2006/0079263 A1 Apr. 13, 2006

(30) Foreign Application Priority Data

Jan. 31, 2003 (JP) ............................. 2003-023085

(51) Int. Cl.
*H04B 7/00* (2006.01)
(52) U.S. Cl. ................ 455/522; 455/67.13; 455/69
(58) Field of Classification Search ................ 455/512, 455/522
See application file for complete search history.

(56) References Cited

U.S. PATENT DOCUMENTS

| | | | | |
|---|---|---|---|---|
| 6,035,210 A | * | 3/2000 | Endo et al. ................ | 455/522 |
| 6,414,946 B1 | * | 7/2002 | Satou et al. ................ | 370/328 |
| 6,718,180 B1 | * | 4/2004 | Lundh et al. ............... | 455/522 |
| 6,865,397 B2 | * | 3/2005 | Park et al. ................. | 455/522 |
| 6,904,290 B1 | * | 6/2005 | Palenius .................... | 455/522 |
| 6,961,577 B2 | * | 11/2005 | Nagato et al. .............. | 455/450 |
| 6,967,987 B2 | * | 11/2005 | Higuchi et al. ............. | 375/130 |
| 7,050,760 B2 | * | 5/2006 | Itoh ......................... | 455/67.13 |
| 7,069,039 B2 | * | 6/2006 | Shinozaki .................. | 455/522 |
| 7,096,034 B2 | * | 8/2006 | Zhang et al. ............... | 455/522 |
| 2002/0012383 A1 | * | 1/2002 | Higuchi et al. ............. | 375/141 |

(Continued)

FOREIGN PATENT DOCUMENTS

EP 1248388 A1 * 10/2002

(Continued)

OTHER PUBLICATIONS

A. Sampath et al., "On Setting Reverse Link Target SIR in a CDMA System", 0-7803-3659-3/97 1997, p. 929-933.

*Primary Examiner*—Matthew Anderson
*Assistant Examiner*—Hai V Nguyen
(74) *Attorney, Agent, or Firm*—Young & Thompson

(57) ABSTRACT

When a reception data block has no error (S1: NO), a target SIRt is updated by a reduction amount according to the count CBN having no reception data block error continuously (S3). That is, when the CBN is 1 to 100, reduction is made by $\Delta SIRt \times BLERt/(1-BLERt)$ (Here, the BLERt is a target block error ratio). When the CBN is 101 to 200, reduction is made by $2 \times \Delta SIRt \times BLERt/(1-BLERt)$. When the CBN is 201 to 300, reduction is made by $3 \times \Delta SIRt \times BLERt/(1-BLERt)$. Thus, it is possible to rapidly reduce the reception level.

9 Claims, 5 Drawing Sheets

U.S. PATENT DOCUMENTS

| | | | |
|---|---|---|---|
| 2003/0064744 A1* | 4/2003 | Zhang et al. | 455/522 |
| 2004/0008639 A1* | 1/2004 | Yano et al. | 370/318 |
| 2005/0130690 A1* | 6/2005 | Shinozaki | 455/522 |
| 2005/0243793 A1* | 11/2005 | Kim et al. | 370/347 |
| 2006/0079263 A1* | 4/2006 | Kondo | 455/522 |
| 2007/0042718 A1* | 2/2007 | Camacho et al. | 455/69 |

FOREIGN PATENT DOCUMENTS

| | | |
|---|---|---|
| JP | 2000-252917 | 9/2000 |
| JP | 2000-324046 | 11/2000 |
| JP | 2001-156711 | 6/2001 |
| JP | 2001-156869 | 6/2001 |
| JP | 2002-016545 | 1/2002 |
| JP | 2002-185398 | 6/2002 |
| JP | 2003-018089 | 1/2003 |

* cited by examiner

US 7,440,769 B2

TARGET VALUE CONTROL METHOD FOR TRANSMISSION POWER CONTROL, BASE STATION CONTROL DEVICE AND MOBILE STATION USED FOR THE SAME

TECHNICAL FIELD

The present invention relates to a target value control method for transmission power control and a base station control device and mobile station used for the target value control method and, more particularly, to an improvement of a target transmission power value change control method of controlling the transmission power of a radio channel between a mobile station and a base station in a mobile communication system.

BACKGROUND ART

A transmission power control method in a conventional mobile communication system will be explained. As shown in FIG. 1, the mobile communication system generally comprises a mobile station 1, radio base stations (to be simply referred to as base stations hereinafter) 2 and 3, and a base station control device 4 which controls these base stations.

Power control of the up link (UL) will be explained. The base station measures an SIR (Signaling Interference Ratio) equivalent to a UL radio reception level, and compares the SIR with a UL target SIR (target transmission power value) sent from the base station control device 4. If the measured SIR is lower than the target SIR, the base station instructs the mobile station 1 via the down link (DL) to increase the UL transmission power by a step designated in advance. To the contrary, if the measured SIR is higher than the target SIR, the base station instructs the mobile station via the DL to decrease the UL transmission power by a step designated in advance.

The base station control device 4 receives UL radio qualities (including reception data qualities) sent from the base stations 2 and 3, and calculates information (target SIR) for controlling to keep the UL reception quality constant. The target SIR calculation method will be explained below. In the following description, the target SIR will be abbreviated to SIRt.

In order to maintain the BLER (BLock Error Ratio) of a reception data block at a constant value (target BLER: to be simply referred to as BLERt hereinafter), when the reception data block has an error, the SIRt is increased by $\Delta$SIRt. That is, the SIRt is updated to (SIRt+$\Delta$SIRt). If the reception data block does not have any error, the SIRt is decreased by $\Delta$SIRt$\times$BLERt/(1−BLERt). That is, the SIRt is updated to (SIRt−$\Delta$SIRt$\times$BLERt/(1−BLERt)).

More specifically, the SIRt serving as a target SIR is updated and controlled as shown in FIG. 9. A required SIR (dotted line in FIG. 9) is 5 dB, $\Delta$SIRt is 0.5 dB, and the BLERt as a target BLER is 0.01 (1%). In this case, if the SIRt becomes lower than 5 dB, an error occurs in reception data, and the SIRt increases by $\Delta$SIRt=0.5 dB. The SIRt is equal to or higher than 5 dB during (1−BLERt)/BLERt=99 (corresponding to 99 blocks), and becomes lower than 5 dB again upon the lapse of a time corresponding to the 99 blocks (in FIG. 9, the SIRt seems to be on the 5-dB dotted line, but in practice, is slightly below the 5-dB dotted line).

Then, an error occurs in reception data, the SIRt becomes higher again by $\Delta$SIRt=0.5 dB, and the same operation is repeated. Transmission power control is executed so that the radio quality of the up link (UL) satisfies a target BLER (BLERt). The above-described transmission power control method is disclosed in, e.g., Ashwin Sampath et al., "On Setting Reverse Link Target SIR in a CDMA System", Vehicular Technology Conference, 1997 IEEE 47th, Vol. 2, 4-7 May, 1997, pp. 929-933.

The transmission power control method in the conventional mobile communication system suffers the following problems. That is, when a required reception level for obtaining a required radio quality drops upon a change in radio propagation environment, the reception level cannot be quickly decreased following the drop of the required reception level.

In general, as the moving speed of a mobile station changes, the required SIR also changes. For example, when the mobile station changes from a high-speed moving state to a low-speed moving state within a short time, the required SIR changes from a high level to a low level. When the required SIR changes from 15 dB to 5 dB, as represented by a dotted line in FIG. 10, the above-described conventional method gradually decreases the target SIR (SIRt), as represented by a solid line in FIG. 10, and cannot quickly decrease the reception level. While the reception level drops, communication is done at excessive power with an excessive communication quality, wasting power consumption.

DISCLOSURE OF INVENTION

It is an object of the present invention to provide a target value control method for transmission power control in a mobile communication system in which, when a reception level required to obtain a required reception quality drops upon a change in radio propagation environment, the reception level can be quickly decreased, and even if the reception level is quickly decreased, the reception quality does not degrade, and a base station control device and mobile station used for the target value control method.

A target value control method according to the present invention is characterized by comprising the first step of changing and controlling a target value used in transmission power control of a radio channel in order to maintain the radio channel between a mobile station and a base station at a predetermined reception quality, and the second step of variably controlling a decrease amount of the target value in accordance with the reception quality of the radio channel.

A base station control device according to the present invention is characterized by comprising selection/synthesis means for receiving from a base station a reception quality of a radio up link from a mobile station to the base station, and target value control means for changing a target value used in transmission power control of the radio up link in the base station, variably controlling a decrease amount of the target value in accordance with the reception quality, and notifying the base station of the changed target value in order to maintain the radio up link at a predetermined reception quality.

A mobile station according to the present invention is characterized by comprising down-link SIR measurement means for measuring an SIR (Signaling Interference Ratio) of a radio down link from a base station to the mobile station, down-link quality measurement means for measuring a reception quality of the radio down link, target value control means for changing a target value used in transmission power control of the radio down link to the base station, and variably controlling a decrease amount of the target value in accordance with the reception quality in order to maintain the radio down link at a predetermined reception quality, and means for instructing the base station to increase/decrease transmission power of the radio down link in accordance with a comparison result between the updated target value and the SIR.

According to the present invention, a program for causing a computer to execute operation of a base station control device which changes and controls a target value for transmission power control of a radio up link from a mobile station to a base station in order to maintain the target value at a predetermined reception quality is characterized by causing the computer to execute the step of variably controlling a decrease amount of the target value in accordance with the reception quality of the radio up link.

According to the present invention, another program for causing a computer to execute operation of a mobile station which changes and controls a target value for transmission power control of a radio down link from a base station in order to maintain the target value at a predetermined reception quality is characterized by causing the computer to execute the step of variably controlling a decrease amount of the target value in accordance with the reception quality of the radio down link.

BEST MODE FOR CARRYING OUT THE INVENTION

Embodiments of the present invention will be described in detail below with reference to the accompanying drawings.

[Mobile Communication System]

Figure 1:
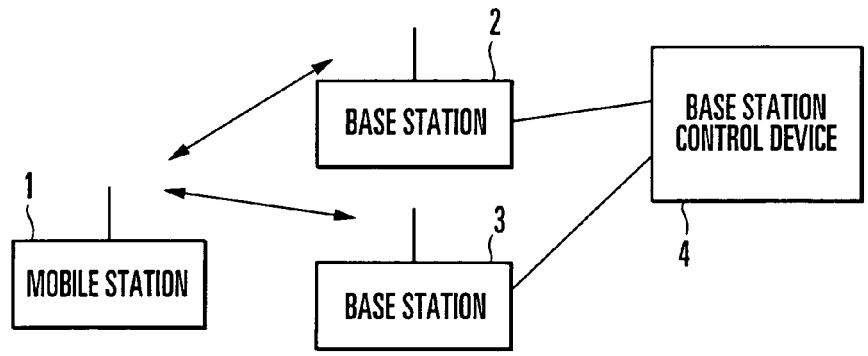
FIG. 1 is a view of a schematic system configuration to which an embodiment of the present invention is applied.
Figure 2:
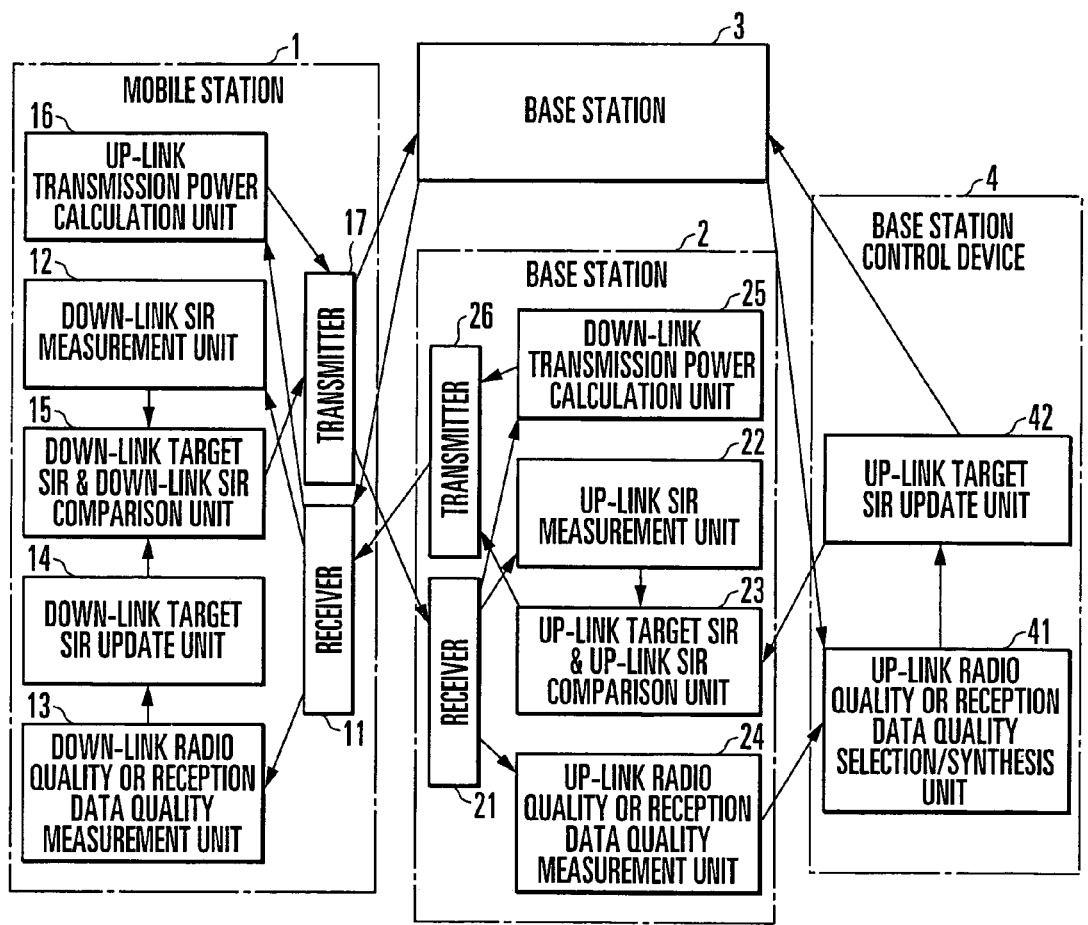
FIG. 2 is a functional block diagram of each device in FIG. 1.

FIG. 1 is a schematic view of a mobile communication system to which an embodiment of the present invention is applied. The mobile communication system comprises a mobile station 1, base stations 2 and 3, and a base station control device 4. FIG. 2 is a functional block diagram of the mobile station 1, base stations 2 and 3, and base station control device 4 in FIG. 1. The base stations 2 and 3 have the same configuration, and the functional block of only the base station 2 is illustrated in FIG. 2.

[Base Station]

The base station 2 will be explained with reference to FIG. 2. A receiver 21 receives a UL signal from the mobile station 1. An up-link SIR measurement unit 22 measures a UL SIR from the UL reception level. An up-link target SIR & up-link SIR comparison unit 23 compares the UL SIR with a UL target SIR (UL SIRt) sent from the base station control device 4. When the UL SIR is lower than the UL SIRt, the up-link target SIR & up-link SIR comparison unit 23 sends to a transmitter 26 information which instructs the mobile station via the DL to increase the UL transmission power, and when the UL SIR is higher than the UL SIRt, sends to the transmitter 26 information which instructs the mobile station via the DL to decrease the UL transmission power.

An up-link radio quality or reception data quality measurement unit 24 measures the UL radio quality or reception data quality of a signal received by the receiver 21, and notifies the base station control device 4 of the measurement result. A down-link transmission power calculation unit 25 extracts DL transmission power instruction information sent from the receiver 21, calculates a UL transmission power in accordance with the information, and notifies the transmitter 26 of the UL transmission power. The transmitter 26 transmits information which instructs the mobile station to increase/decrease the UL transmission power, and performs transmission at a transmission power value designated by the down-link transmission power calculation unit 25.

[Base Station Control Device]

The base station control device 4 will be explained. An up-link radio quality or reception data quality selection/synthesis unit 41 receives UL radio qualities or reception data qualities sent from one or a plurality of base stations, and selects and synthesizes them. An up-link target SIR update unit 42 compares the selected/synthesized UL radio quality or reception data quality with a UL radio quality or reception data quality which satisfies a required quality set in advance. The up-link target SIR update unit 42 updates the UL target SIR (UL SIRt) so as to satisfy the required quality, and notifies the base station of the updated UL SIRt.

[Mobile Station]

The mobile station 1 will be explained. A receiver 11 receives a down-link signal from the base station. A down-link SIR measurement unit 12 measures an SIR equivalent to a DL radio reception level. A down-link radio quality or reception data quality measurement unit 13 measures the DL radio quality or reception data quality of a signal received by the receiver 11, and notifies a down-link target SIR update unit 14 of the measurement result. The down-link target SIR update unit 14 compares the DL reception quality or reception data quality with a DL radio quality or reception data quality which satisfies a required quality set in advance. The down-link target SIR update unit 14 updates the DL target SIR so as to satisfy the required quality, and notifies a down-link target SIR & down-link SIR comparison unit 15 of the updated DL target SIR.

The down-link target SIR & down-link SIR comparison unit 15 compares the DL SIR with a DL target SIR serving as a DL target radio reception level. When the DL SIR is higher than the DL target SIR, the down-link target SIR & down-link SIR comparison unit 15 sends to a transmitter 17 information which instructs the base station via the UL to decrease the DL transmission power, and when the DL SIR is lower than the DL target SIR, sends to the transmitter 17 information which instructs the base station via the UL to increase the DL transmission power. An up-link transmission power calculation unit 16 extracts up-link transmission power instruction information from a signal received by the receiver 11, calculates a UL transmission power in accordance with the instruction information, and notifies the transmitter 17 of the UL transmission power. The transmitter 17 transmits, to the base station, information which instructs the base station to increase/decrease the DL transmission power, and performs transmission at a transmission power value designated by the up-link transmission power calculation unit 16.

First Embodiment

An update control mode of a target SIR (to be referred to as SIRt) for transmission power control according to the first embodiment of the present invention will be described. First, UL transmission power control will be explained. In the base station, an up-link SIR measurement unit 22 measures an SIR serving as a UL radio reception level, and a comparison unit 23 compares the measured SIR with an SIRt serving as a UL target SIR which is sent in advance from a base station control device 4. If the SIR is lower than the SIRt as a result of comparison, the base station instructs a mobile station 1 via the DL to increase the UL transmission power, and if the SIR is higher than the SIRt, instructs the mobile station 1 via the DL to decrease the UL transmission power.

An up-link radio quality or reception data quality measurement unit 24 measures a UL radio quality (also including a reception data quality), and notifies the base station control device 4 of the measurement result. The radio quality is, e.g., error information of a reception data block, and will be called a BLER (Block Error Ratio). The base station control device 4 receives UL radio qualities from a plurality of base stations, and an up-link target SIR update unit 42 calculates a UL target SIR (SIRt) serving as information for controlling to keep the UL reception quality constant.

Figure 3:
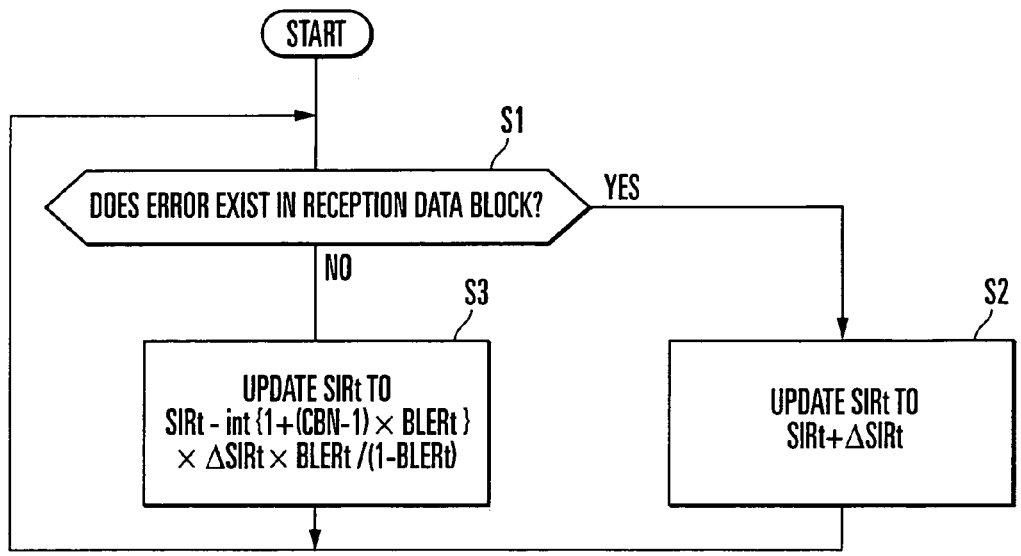
FIG. 3 is a flowchart of the first embodiment of the present invention.

The UL SIRt calculation method is shown in the flowchart of FIG. 3. The UL BLER is used as a UL radio quality, and the BLER is kept at a predetermined target value (BLERt). In this case, if an error exists in a reception data block (step S1: YES), the SIRt is increased by $\Delta$SIRt (predetermined value). That is, the SIRt is updated to SIRt+$\Delta$SIRt (step S2). If no error exists in the reception data block (S1: NO), the SIRt is updated to SIRt$-$int$\{1+$(CBN$-$1)$\times$BLERt$\}\times\Delta$SIRt$\times$BLERt/(1$-$BLERt) (step S3).

At this time, int{ } means a function of rounding down the decimal part into an integer, and CBN (Continuous Block Number) represents the number of continuous reception data blocks free from any error. For BLERt=0.01% and CBN=1 to 100, int{ }=1, and the SIRt is updated to SIRt$-\Delta$SIRt$\times$BLERt/(1$-$BLERt), similar to the prior art.

Figure 10:
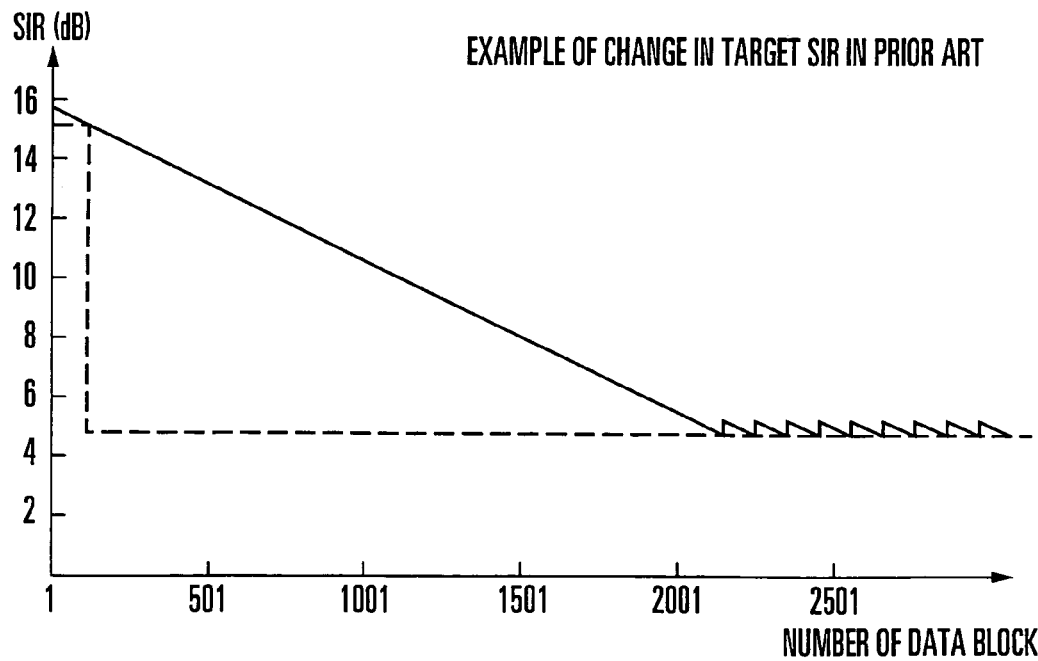
FIG. 10 is a graph showing an example of a change in target SIR in the prior art.

However, for CBN=101 to 200, int{ }=2, and the SIRt is updated to SIRt$-2\times\Delta$SIRt$\times$BLERt/(1$-$BLERt). For CBN=201 to 300, int{ }=3, and the SIRt is updated to SIRt$-3\times\Delta$SIRt$\times$BLERt/(1$-$BLERt). In other words, as the number of continuous reception data blocks free from any error increases, the SIRt decrease amount is increased. With this setting, the SIRt changes as shown in FIG. 4 under the same condition as that of the prior art shown in FIG. 10.

Figure 4:
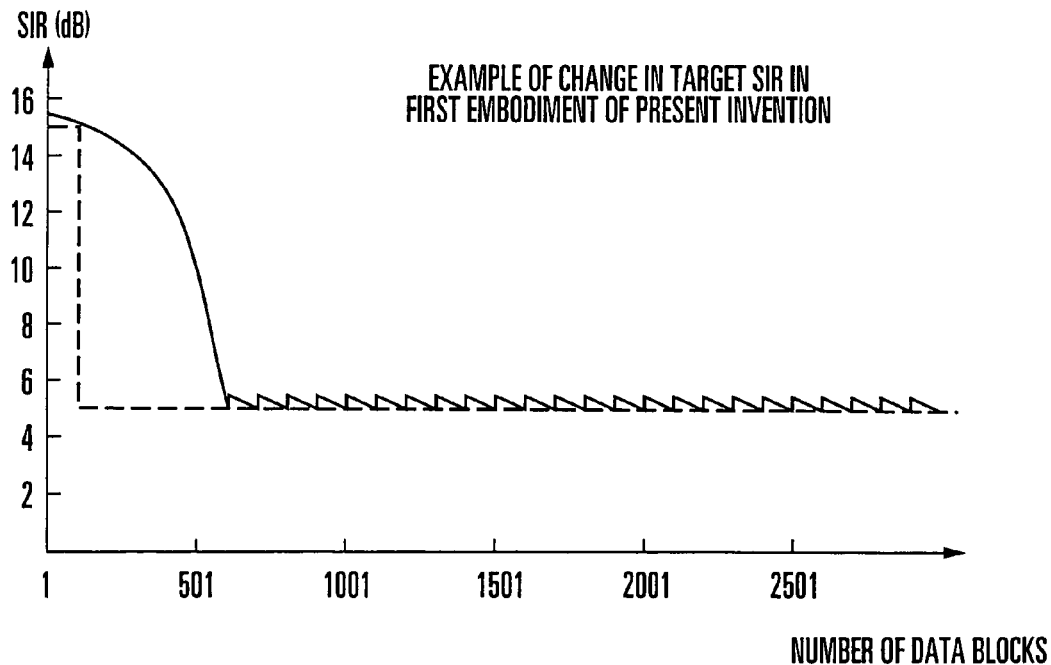
FIG. 4 is a graph showing an example of a change in target SIR in the first embodiment of the present invention.

FIG. 4 shows an example of a change in SIRt when a required SIR changes from 15 dB to 5 dB, as represented by the dotted line, and no error appears in continuous reception data blocks. As is apparent from a comparison between FIGS. 4 and 10, when the required SIR changes from high level to low level, the SIRt control method according to the first embodiment can quickly change the target SIR (SIRt) to the required SIR (5 dB in the example of FIG. 4), and can also decrease the UL reception level.

Obviously, the comparison unit 23 of the base station is notified of the calculated/updated SIRt and the SIRt is set as an up-link target SIR.

SIRt update control in UL transmission power control has been described, and next, SIRt update control in DL transmission power control will be explained. In the mobile station 1, a down-link SIR measurement unit 12 measures an SIR serving as a DL radio reception level, and a comparison unit 15 compares the measured SIR with an SIRt serving as a preset DL target SIR. If the SIR is lower than the SIRt as a result of comparison, the mobile station 1 instructs a base station via the UL to increase the DL transmission power, and if the SIR is higher than the SIRt, instructs the base station via the UL to decrease the DL transmission power.

A down-link radio quality or reception data quality measurement unit 13 measures a DL radio quality (also including a reception data quality), and notifies a down-link target SIR update unit 14 of the measurement result. The radio quality is, e.g., error information BLER of a reception data block. By using the notified DL BLER, the update unit 14 calculates a DL target SIR (SIRt) serving as information for controlling to keep the DL reception quality constant. This calculation method complies with the same procedures as those shown in the flowchart of FIG. 3. The comparison unit 15 is notified of the calculated/updated SIRt, and the SIRt is set as a down-link target SIR. An example of a change in SIRt is also the same as that shown in FIG. 4.

Second Embodiment

A control mode of a target SIR (SIRt) for transmission power control according to the second embodiment of the present invention will be described. First, an SIRt control method in UL transmission power control will be explained. An up-link quality or reception data quality measurement unit 24 in a base station measures a UL BLER, and notifies a base station control device 4 of the UL BLER. The base station control device 4 receives UL BLERs from a plurality of base stations, and an up-link target SIR update unit 42 calculates a UL target SIR (SIRt) serving as information for controlling to keep the UL reception quality constant.

Figure 5:
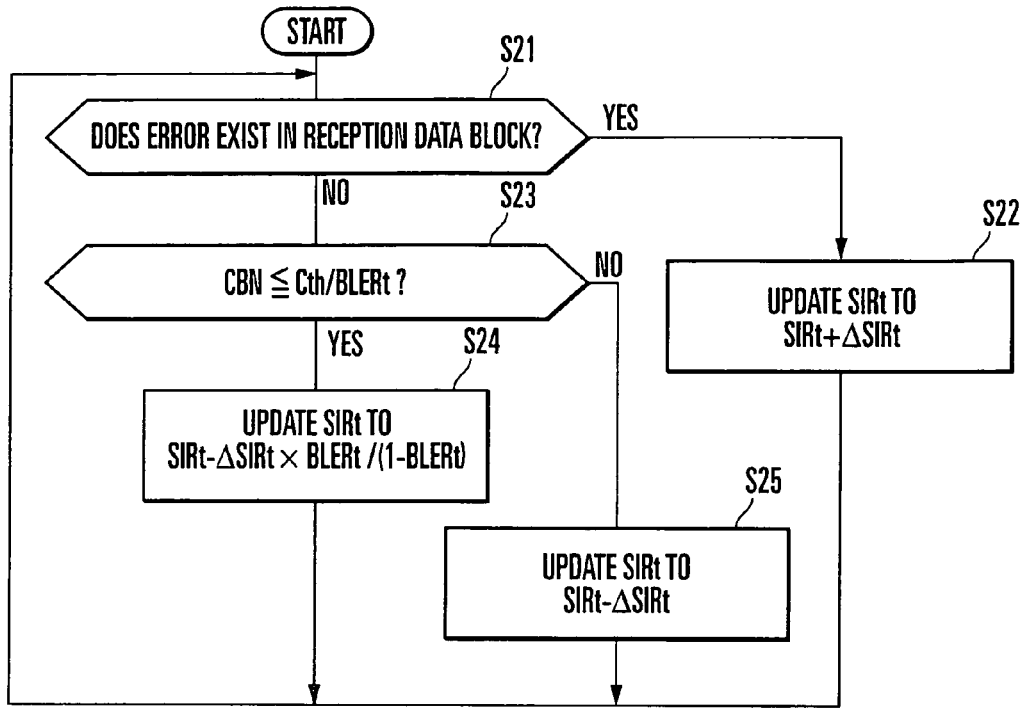
FIG. 5 is a flowchart of the second embodiment of the present invention.

The UL SIRt calculation method is shown in the flowchart of FIG. 5. The UL BLER is used as a UL radio quality, and the BLER is kept at a predetermined target value (BLERt). In this case, if an error exists in a reception data block (step S21: YES), the SIRt is increased by $\Delta$SIRt (predetermined value) (step S22). If no error exists in reception data (S21: NO), the flow branches into the following two cases.

More specifically, a threshold Cth of the number of continuous reception data blocks free from any error is introduced. The SIRt update aspect is changed between two cases: whether the CBN (Continuous Block Number) representing the number of continuous reception data blocks free from any error is equal to or smaller than Cth/BLERt, or is larger than it. For BLERt=0.01 (1%) and Cth=2.0 (in general, 1.0 to 3.0), Cth/BLERt=200. If the CBN is equal to or lower than 200 (step S23: YES), the SIRt is updated to SIRt$-\Delta$SIRt$\times$BLERt/(1$-$BLERt) (step S24). This is the same as the process in the first embodiment and prior art.

If the CBN exceeds 200 (step S23: NO), the SIRt is updated to SIRt$-\Delta$SIRt (step S25). In other words, if the number of continuous reception data blocks free from any error exceeds a predetermined threshold, the SIRt is decreased at once by a predetermined maximum amount ($\Delta$SIRt).

Figure 6:
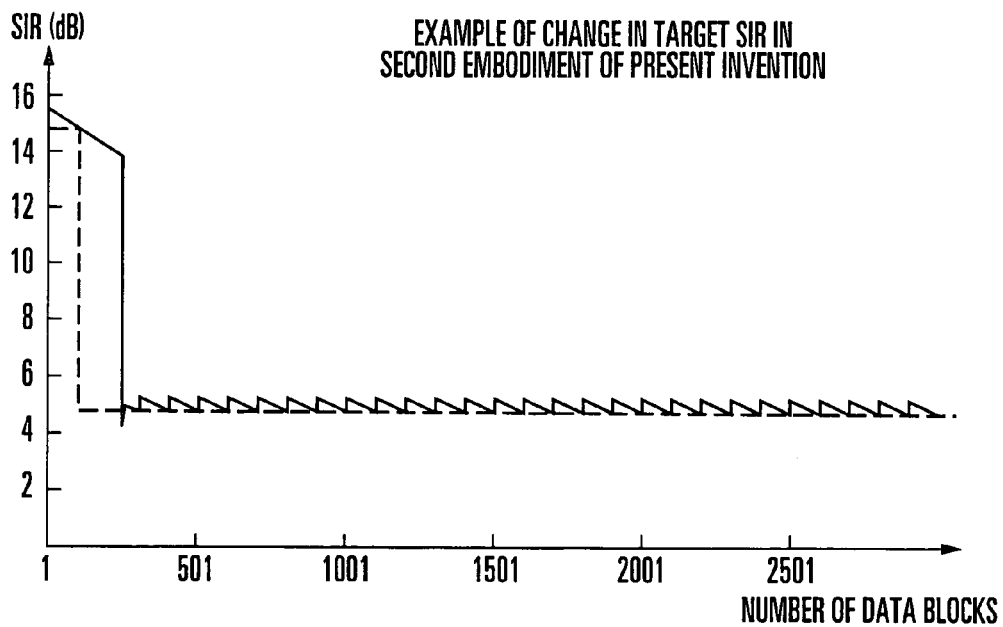
FIG. 6 is a graph showing an example of a change in target SIR in the second embodiment of the present invention.

FIG. 6 shows an example of a change in target SIR in the second embodiment. The condition in FIG. 6 is the same as those in FIGS. 10 and 4, and Cth/BLERt=200 (Cth=2.0).

The SIRt update method in UL transmission power control has been described. For the DL, the same update operation as that described above is executed in a mobile station 1.

Third Embodiment

Figure 7:
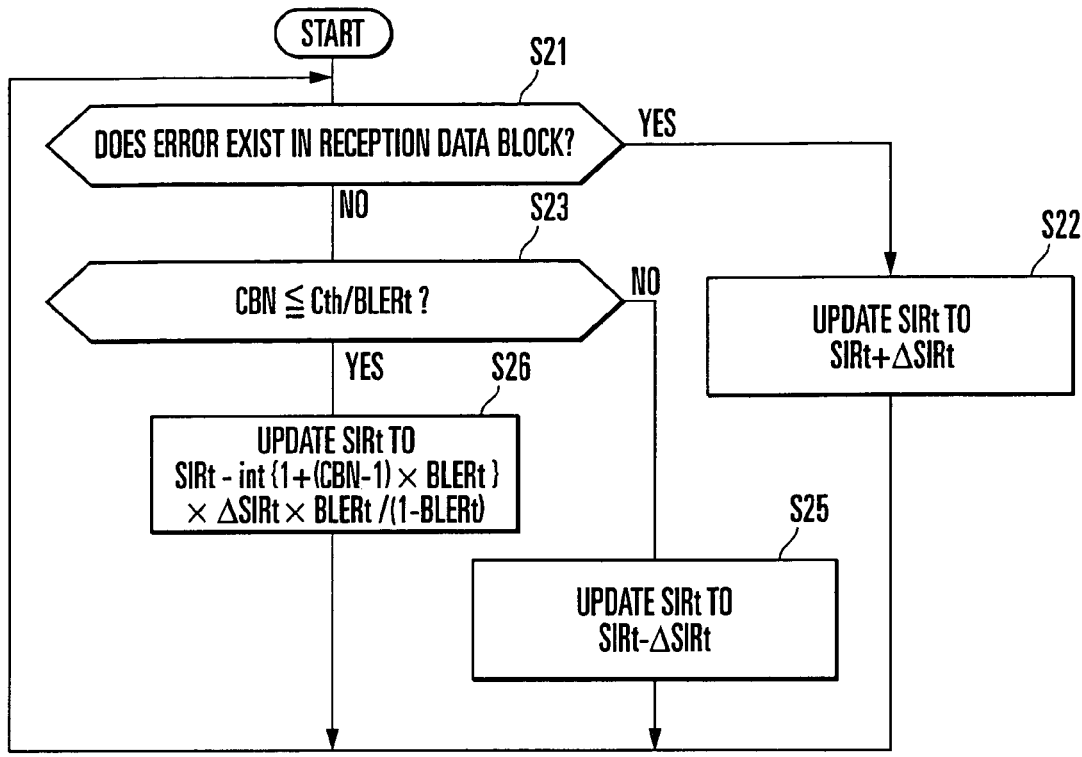
FIG. 7 is a flowchart of the third embodiment of the present invention.

The third embodiment of the present invention will be described. The third embodiment is a combination of the first and second embodiments, and operation procedures of the third embodiment are shown in FIG. 7. In FIG. 7, the same reference symbols as in FIG. 5 denote the same steps. FIG. 7 is different from FIG. 5 in that, if "YES" (affirmative) in step S23, the SIRt is updated to SIRt=SIRt−int{1+(CBN−1)×BLERt}×ΔSIRt×BLERt/(1−BLERt) (step S26), which is the same as step S3 in FIG. 3.

Figure 8:
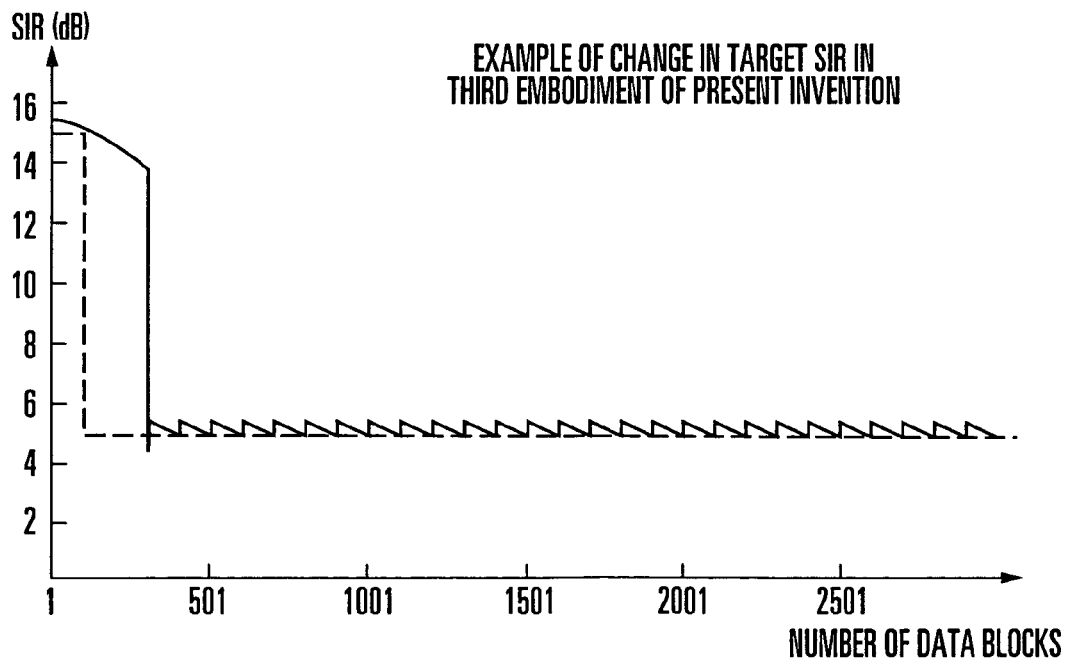
FIG. 8 is a graph showing an example of a change in target SIR in the third embodiment of the present invention.
Figure 9:
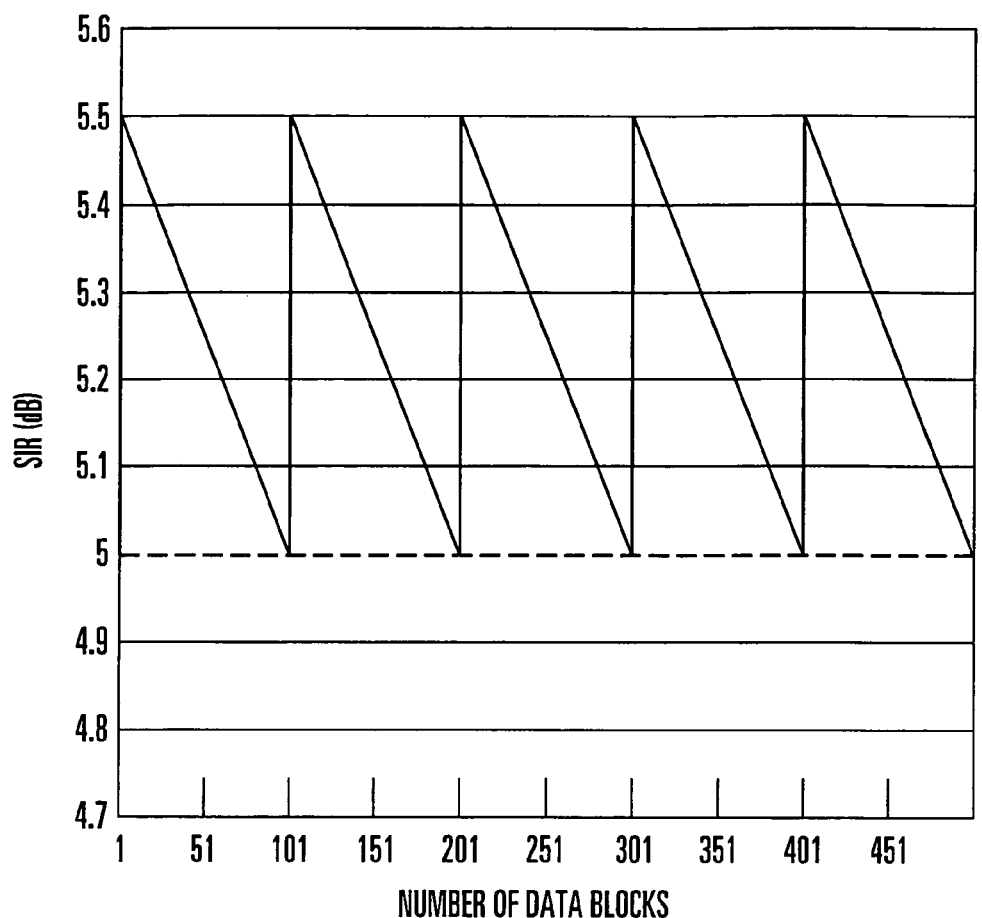
FIG. 9 is a graph showing an example of a change in target SIR when a required SIR is 5 dB.

FIG. 8 shows an example of a change in target SIR in the third embodiment. The condition in FIG. 8 is the same as those in FIGS. 10, 4, and 6, and Cth/BLERt=300 (Cth=3.0).

When the required SIR changes from 15 dB to 5 dB, as described in the above embodiments, the simulation result exhibits BLER=0.95% in the first embodiment and BLER=0.99% in the second embodiment. Both of the results satisfy the target BLER=1% (0.01).

The operation in each of the above-described embodiments can be achieved by recording operation procedures as a program on a recording medium in advance, and reading and executing the program by a computer.

As has been described above, according to the above-described embodiments, the change amount (decrease amount) of the target SIR is controlled in accordance with the number of continuous reception data blocks free from any error. As the continuous block number increases, the decrease amount is increased. Even if a reception level required to obtain a required reception quality drops upon a change in radio propagation environment, the reception level can be quickly decreased. Since the reception level can be decreased more quickly than in the prior art, transmission at excessive power with an excessive communication quality can be prevented. Also, even if the reception level is quickly decreased, the reception quality does not degrade.

The invention claimed is:

1. A target value control method characterized by comprising:
the first step of changing and controlling a target value used in transmission power control of a radio channel in order to maintain the radio channel between a mobile station and a base station at a predetermined reception quality; and
the second step of variably controlling a decrease amount of the target value in accordance with the reception quality representing an error state of reception data blocks in the radio channel,
the second step comprising the third step of variably controlling the decrease amount in accordance with a continuous block count by which no error occurs in the reception data blocks,
the third step comprising the fourth step of increasing the decrease amount as the continuous block count increases, and
the fourth step comprising the step of switching the decrease amount from a small amount to a large amount before and after the continuous block count reaches a predetermined value.

2. A target value control method according to claim 1, characterized in that the fourth step further comprises the step of changing the decrease amount to a predetermined maximum amount immediately after the continuous block count reaches the predetermined value.

3. The target value control method according to claim 1, wherein the third step of determining a decrease amount is expressed as SIRt−int {1+(CBN −1)×BLERt}×ΔSIRt× BLERt/(1−BLERt).

4. A base station control device characterized by comprising:
selection/synthesis means for receiving from a base station from a reception quality of a radio up link from a mobile station to the base station; and
target value control means for changing a target value used in transmission power control of the radio up link in the base station, variably controlling a decrease amount of the target value in accordance with the reception quality representing an error state of reception data blocks in the radio channel, and notifying the base station of the changed target value in order to maintain the radio up link at a predetermined reception quality, wherein said target value control means variably controls the decrease amount in accordance with a continuous block count by which no error occurs in the reception data blocks.

5. A base station control device according to claim 4, characterized in that said target value control means increases the decrease amount as the continuous block count increases.

6. A base station control device according to claim 5, characterized in that said target value control means switches the decrease amount from a small amount to a large amount before and after the continuous block count reaches a predetermined value.

7. A base station control device according to claim 6, characterized in that said target value control means changes the decrease amount to a predetermined maximum amount immediately after the continuous block count reaches the predetermined value.

8. A mobile station characterized by comprising:
down-link SIR measurement means for measuring an SIR (Signaling Interference Ratio) of a radio down link from a base station to the mobile station;
down-link quality measurement means for measuring a reception quality of the radio down link;
target value control means for changing a target value used in transmission power control of the radio down link to the base station, and variably controlling a decrease amount of the target value in accordance with the reception quality representing an error state of reception data blocks in the radio channel in order to maintain the radio down link at a predetermined reception quality; and
means for instructing the base station to increase/decrease transmission power of the radio down link in accordance with a comparison result between the updated target value and the SIR,
wherein said target value control means variably controls the decrease amount in accordance with a continuous block count by which no error occurs in the reception data blocks, increases the decrease amount as the continuous block count increases, and switches the decrease amount from a small amount to a large amount before and after the continuous block count reaches a predetermined value.

9. A mobile station according to claim 8, characterized in that said target value control means changes the decrease amount to a predetermined maximum amount immediately after the continuous block count reaches the predetermined value.

* * * * *